United States Patent
Dharmadhikari et al.

(10) Patent No.: US 11,172,419 B2
(45) Date of Patent: Nov. 9, 2021

(54) SYSTEMS AND METHODS FOR REDUCING LATENCY DURING HANDOVER OF USER EQUIPMENT BETWEEN WIRELESS BASE STATIONS

(71) Applicant: CABLE TELEVISION LABORATORIES, INC., Louisville, CO (US)

(72) Inventors: Omkar Shripad Dharmadhikari, Broomfield, CO (US); Bernard McKibben, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 110 days.

(21) Appl. No.: 16/576,619

(22) Filed: Sep. 19, 2019

(65) Prior Publication Data

US 2020/0092775 A1 Mar. 19, 2020

Related U.S. Application Data

(60) Provisional application No. 62/733,201, filed on Sep. 19, 2018.

(51) Int. Cl.
*H04W 36/02* (2009.01)
*H04W 36/00* (2009.01)
*H04W 36/08* (2009.01)

(52) U.S. Cl.
CPC ....... *H04W 36/02* (2013.01); *H04W 36/0055* (2013.01); *H04W 36/08* (2013.01)

(58) Field of Classification Search
CPC .. H04W 36/02; H04W 36/0055; H04W 36/08
See application file for complete search history.

(56) References Cited

U.S. PATENT DOCUMENTS

2018/0007587 A1* 1/2018 Feldman ............. H04L 65/1016
2019/0116118 A1* 4/2019 Kapela ................ H04L 12/4633

* cited by examiner

*Primary Examiner* — Duc C Ho
(74) *Attorney, Agent, or Firm* — PdZ Patent Law, PLLC (57) ABSTRACT

A method for reducing latency during handover of user equipment (UE) between wireless base stations includes (a) receiving, at a network hub in an edge communication network, a first wireless signaling message from a source wireless base station, (b) determining, from the first wireless signaling message at the network hub, occurrence of a handover of UE from the source wireless base station to a target wireless base station, (c) in response to determining occurrence of the handover, translating, at the network hub, an address of first data packets intended for the UE from an address of the source wireless base station to an address of the target wireless base station, and (d) forwarding the first data packets from the network hub to the target wireless base station.

20 Claims, 9 Drawing Sheets

SYSTEMS AND METHODS FOR REDUCING LATENCY DURING HANDOVER OF USER EQUIPMENT BETWEEN WIRELESS BASE STATIONS

RELATED APPLICATIONS

This application claims benefit of priority to U.S. Provisional Patent Application Ser. No. 62/733,201, filed on Sep. 19, 2018, which is incorporated herein by reference.

BACKGROUND

Wireless communication systems commonly support user equipment (UE) mobility, to enable uninterrupted wireless communication as UE moves, and to promote high-performance wireless communication under dynamic operating conditions. For example, long-term evolution (LTE) and fifth-generation (5G) new radio (NR) wireless communication protocols support "S1" mobility and "X2" mobility, to enable UE to roam among wireless base stations. S1 mobility is characterized by a wireless communication system packet core controlling a UE device handover, while X2 mobility is characterized by two wireless base stations controlling a UE device handover.

Edge communication networks, which provide communication services to subscribers, are increasingly being used to provide backhaul communication to wireless base stations. Examples of edge communication networks include, but are not limited to, data over cable service interface specification (DOCSIS) networks, digital subscriber line (DSL) networks, ethernet passive optical network (EPON) networks, radio frequency over glass (RFOG) networks, and a gigabit passive optical network (GPON) networks. Edge communication networks may use a common communication medium, such as a common optical cable or a common coaxial electrical cable, to serve multiple subscribers

DETAILED DESCRIPTION OF THE EMBODIMENTS

Figure 1:
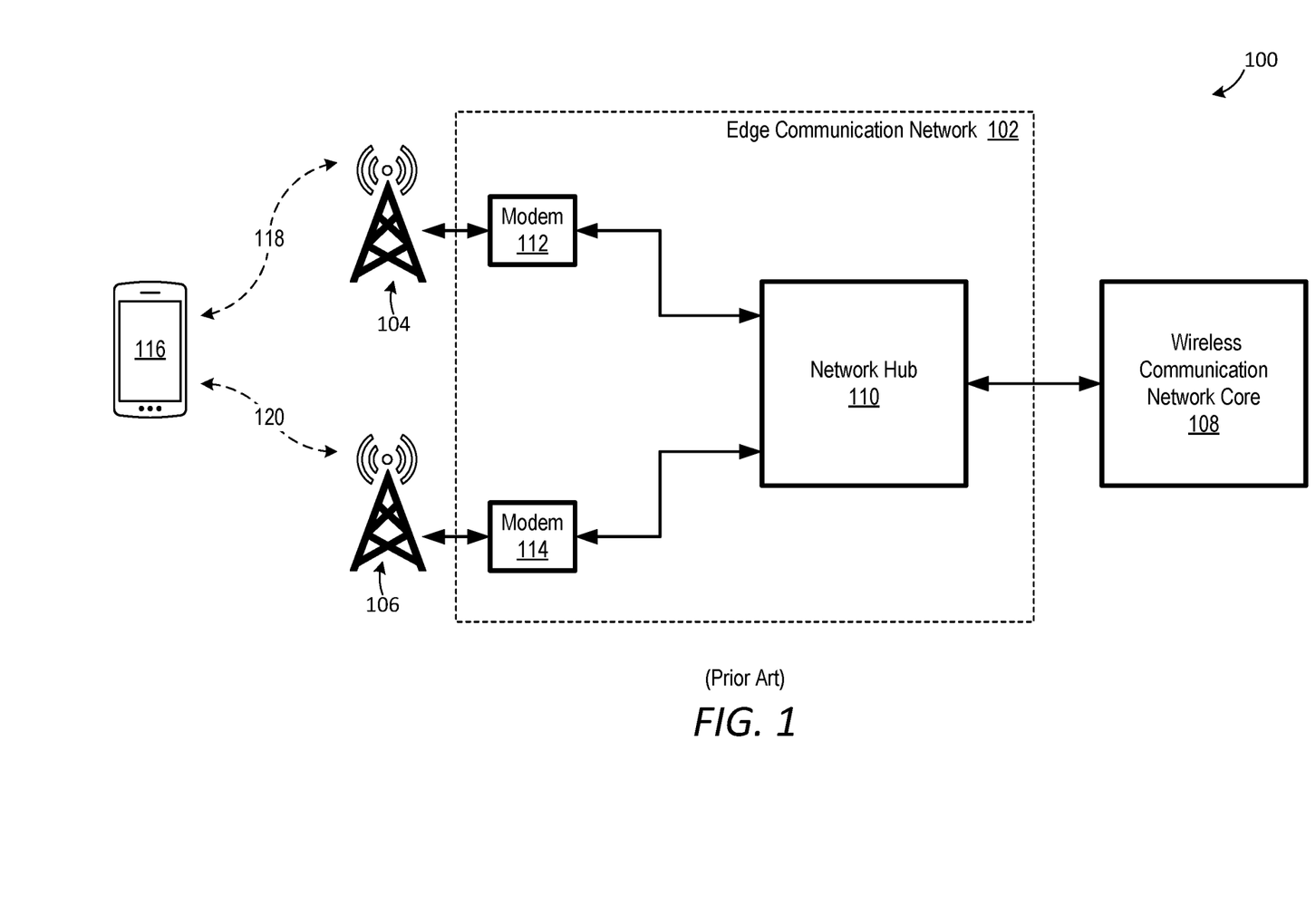
FIG. 1 is a schematic diagram of a communication system including an edge communication network providing backhaul communication to wireless base stations.

FIG. 1 is a schematic diagram of a communication system 100, which is one example of an edge communication network providing backhaul communication to wireless base stations. Communication system 100 includes an edge communication network 102, wireless base stations 104 and 106, and a wireless communication network core 108. Edge communication network 102 includes a network hub 110, a modem 112, and a modem 114. Modem 112 interfaces wireless base station 104 with network hub 110, and modem 114 interfaces wireless base station 106 with network hub 110. Network hub 110 is communicatively coupled to wireless communication network core 108.

UE 116 is initially connected to wireless base station 104, and UE 116 exchanges data with wireless base station 104 via wireless communication signals 118. Communication system 100 subsequently initiates a handover of UE 116 from wireless base station 104 to wireless base station 106, e.g. an S1 handover or an X2 handover, such as due to movement of UE 116 towards wireless base station 106. UE 116 then exchanges data with wireless base station 106 via wireless communication signals 120. Accordingly, wireless base station 104 may be referred to as a source wireless base station, and wireless base station 106 may be referred to as a target wireless base station, during the handover.

Figure 2:
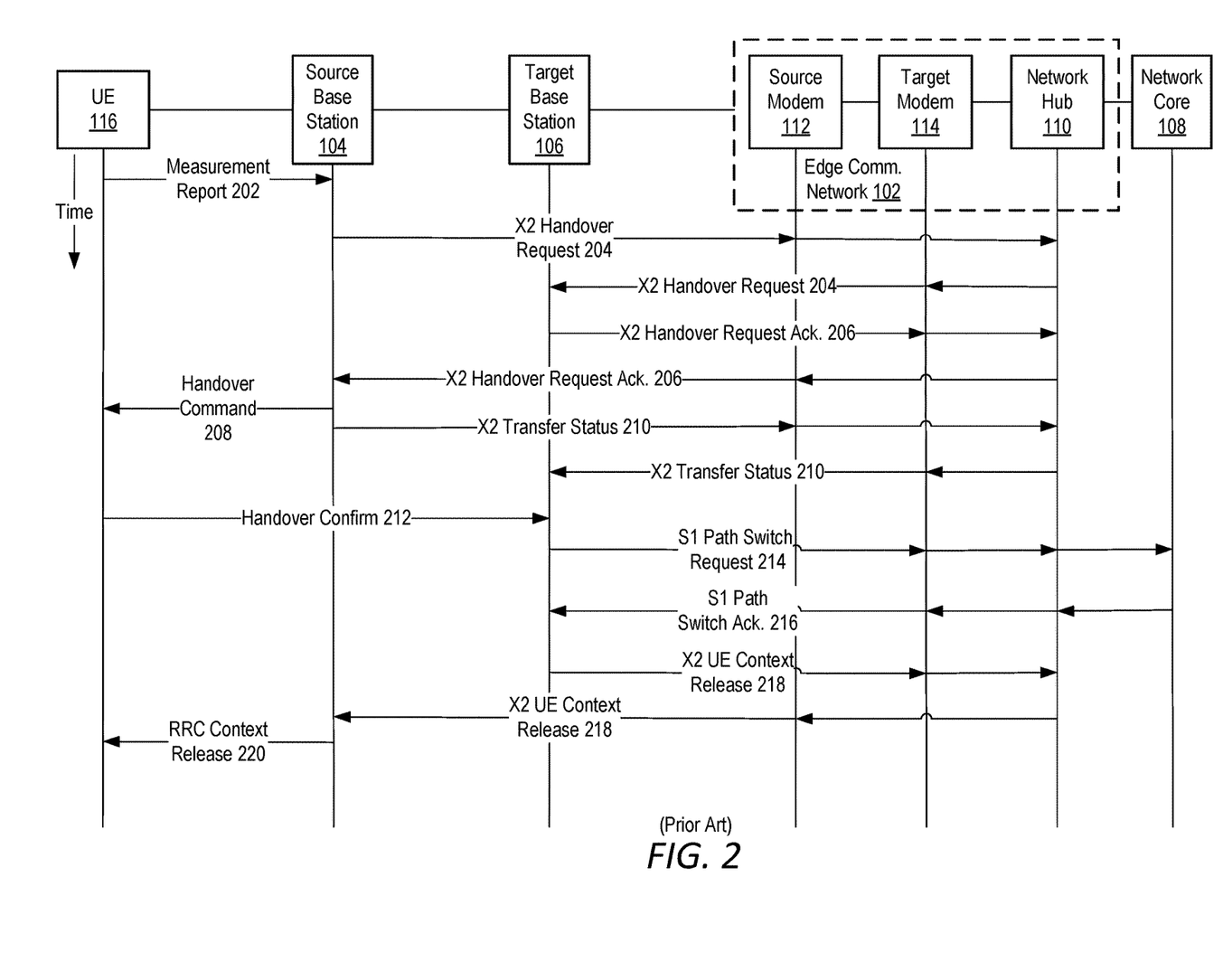
FIG. 2 is a flow diagram illustrating an example of wireless base station handoff in the FIG. 1 communication system.

FIG. 2 is a flow diagram illustrating an example of an X2 handoff of UE 116 from source wireless base station 104 to target wireless base station 106 in communication system 100. UE 116 transmits a measurement report 202 to source wireless base station 104. Measurement report 202 indicates, for example, received signal strength of source wireless base station 104 and target wireless base station 106 at UE device 116. Source wireless base station 104 determines from measurement report 202 that UE 116 would be better served by target wireless base station 106 than by source wireless base station 104, such as due to received signal strength of target wireless base station 106 at UE 116 being stronger than received signal strength of source wireless base station 104 at UE 116. Consequently, source wireless base station 104 transmits an X2 handover request 204 to target wireless base station 106 via source modem 112, network hub 110, and target modem 114. Target wireless base station 106 acknowledges X2 handover request 204 by sending an X2 handover request acknowledge 206 to source wireless base station 104, via target modem 114, network hub 110, and source modem 112.

Source base station 104 next transmits a handover command 208 to UE 116, and source base station 104 then notifies target wireless base station 106 that the handover is proceeding by transmitting an X2 transfer status 210 to target wireless base station 106 via source modem 112, network hub 110, and target modem 114. UE 116 transmits a handover confirm 212 to target wireless base station 106, and target wireless base station 106 proceeds to transmit a S1 path switch request 214 to wireless communication network core 108 via target modem 114 and network hub 110. Wireless communication network core 108 responds to S1 path switch request 214 by (a) transmitting a S1 path switch acknowledge 216 to target wireless base station 106 via network hub 110 and target modem 114 and (b) forwarding data packets intended for UE 116 to target wireless base station 106, instead of to source wireless base station 104.

Target wireless base station 106 responds to 51 path switch acknowledge 216 by transmitting an X2 UE context release 218 to source wireless base station 104 via target modem 114, network hub 110, and source modem 112. Source wireless base station 104 then transmits a radio resource control (RRC) context release 220 to UE 116. The handover of UE 116 is complete, i.e. UE 116 is connected to target wireless base station 106 instead of to source wireless base station 104, after wireless communication network core 108 modifies evolved packet system (EPS) bearers in accordance with the handover.

It should be noted that wireless signaling messages, e.g. S1 path switch request 214 and S1 path switch acknowledge 216, must be transmitted between edge communication network 102 and wireless communication network core 108, during handover of UE 116 from source wireless base station 104 to target wireless base station 106. This wireless signaling message transmission between edge communication network 102 and wireless communication network core 108 can contribute significant latency, e.g. approximately seven milliseconds, to the handover.

Disclosed herein are systems and methods for reducing latency during handover of UE between wireless base stations, in communication systems including an edge communication network providing backhaul communication to wireless base stations. A network hub in the new systems and methods performs at least some aspects of UE handover that is conventionally performed by a wireless communication network core. For example, in some embodiments, the network hub detects a wireless signaling message from a wireless base station, e.g. an S1 path switch request from a wireless base station, and the network hub processes the data packets in accordance with the wireless signaling message, thereby eliminating the need to transmit the wireless signaling message to the wireless communication network core. Accordingly, the new systems and methods reduce latency associated with a UE handover between wireless base stations by reducing the need to transmit wireless signaling messages between a network hub and a wireless communication network core.

Figure 3:
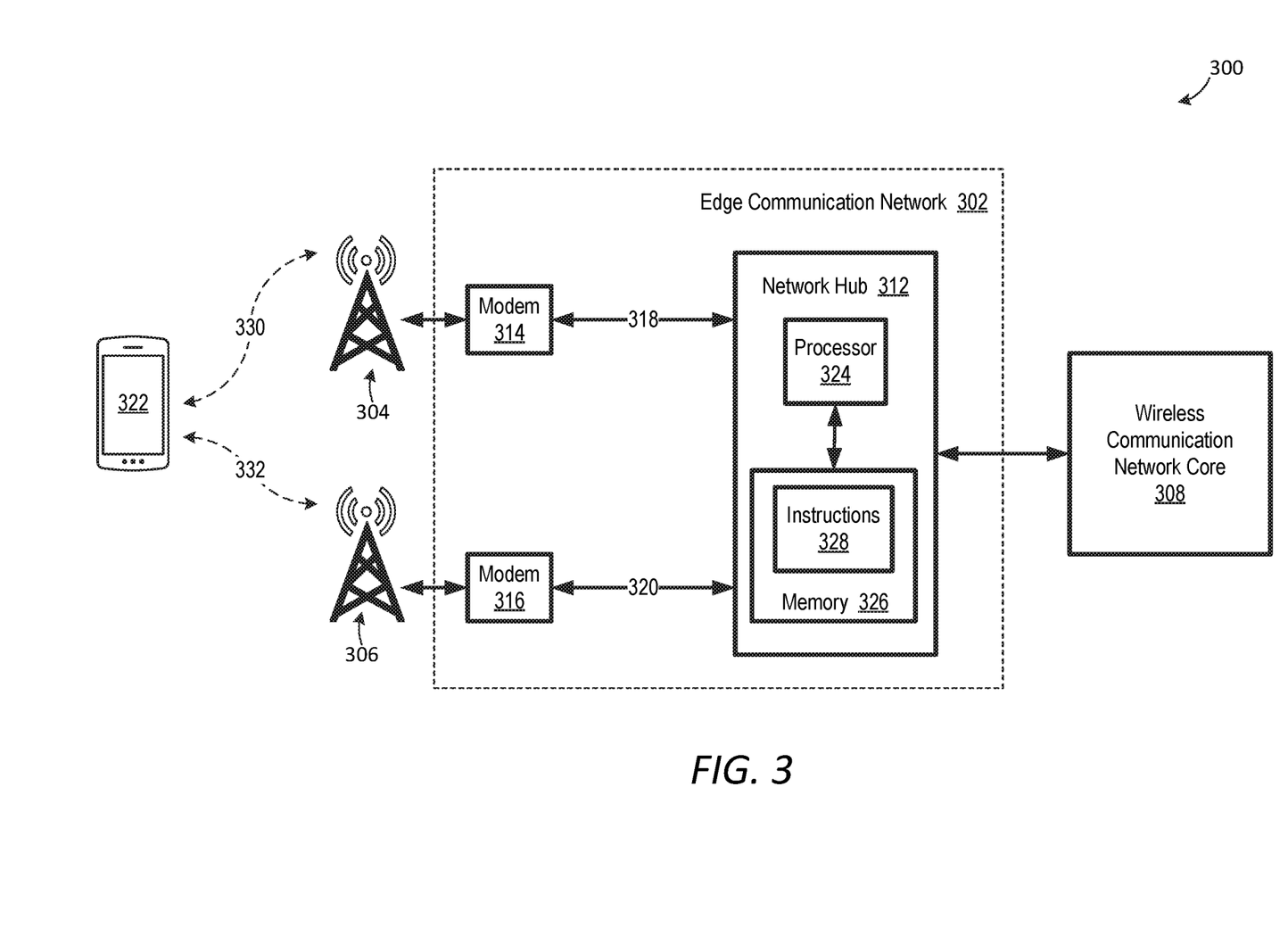
FIG. 3 is a schematic diagram of a communication system including a network hub that is configured to reduce wireless base station handover latency, according to an embodiment.

FIG. 3 is a schematic diagram of a communication system 300, which is one embodiment of the new systems developed by Applicant. Communication system 300 includes a network hub 312, a wireless base station 304, a wireless base station 306, and a wireless communication network core 308. Edge communication network 302 includes a network hub 312, a modem 314, and a modem 316. Modem 314 interfaces wireless base station 304 with network hub 312, and modem 316 interfaces wireless base station 306 with network hub 312. Network hub 312 is communicatively coupled to wireless communication network core 308. Accordingly, edge communication network 302 communicatively couples wireless base stations 304 and 306 to wireless communication network core 308. In some embodiments, network hub 312 is configured as a cable modem termination system (CMTS), as an optical line terminal (OLT), or as a digital subscriber line access multiplexer (DSLAM), such as discussed below with respect to FIGS. 6-8, respectively.

Edge communication network 302 may include additional modems for interfacing additional devices, such as additional wireless base stations, with network hub 312. Additionally, edge communication network 302 may be configured to provide communication services to devices in addition to wireless base stations, such as devices including but not limited to, computing devices, telephonic devices, output devices (e.g. video displays or speakers), data storage devices, and network service devices. Although FIG. 3 illustrates modems 314 and 316 being communicatively coupled to network hub 312 via a respective communication path 318 and 320, modems 314 and 316 may instead share a common communication path with network hub 312.

Each of wireless base stations 304 and 306 is configured to provide a wireless communication link with UE, such as UE 322. In some embodiments, each of wireless base stations 304 and 306 includes an evolved NodeB (eNB), a next generation NodeB (gNB), an Institute of Electrical and Electronics Engineers (IEEE) 802.11-based wireless access point, an Integrated Access and Backhaul (IAB) access point, a microcell, a picocell, a femtocell, a macrocell, or an IEEE 802.11-based application. However, wireless base stations 304 and 306 may take other forms without departing from the scope hereof Although UE 322 is depicted as a mobile telephone, UE 322 may be another type of UE. For example, in some embodiments, UE 322 includes one or more of a computer, a set-top device, a data storage device, an Internet of Things (IoT) device, an entertainment device, a computer networking device, a smartwatch, a wearable device with wireless capability, and a medical device. Alternately or additionally, UE 322 could also be configured as a wireless access point, such as a WiFi hotspot.

Network hub 312 includes a processor 324 and a memory 326. Processor 324 is configured to execute instructions 328 stored in memory 326 to perform functions of network hub 312, e.g. to route data between modems of edge communication network 302 and external resources, such as wireless communication network core 308 or the public Internet (not shown). Instructions 328 are, for example, firmware and/or software. Although processor 324 and memory 326 are illustrated as being single respective devices, one or more of processor 324 and memory 326 can include multiple constituent components, which need not be located at a common location. For example, processor 324 and memory 326 may be implemented by a distributed computing system including a plurality of constituent components at different locations.

Wireless communication network core 308 supports wireless base stations 304 and 306 to provide wireless communication services to UE, such as UE 322. In some embodiments, wireless communication network core 308 includes a LTE wireless communication network core, a 5G NR wireless communication network core, or a sixth-generation (6G) wireless communication network core. Although wireless communication network core 308 is depicted as a single element, wireless communication network core 308 can include multiple constituent components, which need not be located at a common location. For example, wireless communication network core 308 may be implemented by a distributed computing system including a plurality of constituent components at different locations.

Processor 324 is configured to execute instructions 328 to (a) detect at least one type of wireless signaling message from a wireless base station, e.g. an LTE, 5G NR, or 6G wireless signaling message, such as an S1 path switch request, and (b) process the data packets in accordance with the wireless signaling message, thereby eliminating the need to transmit the wireless signaling message to wireless communication network core 308. Accordingly, network hub 312 is advantageously capable of reducing latency associated with a UE handover between wireless base stations by reducing the need to transmit wireless signaling messages between network hub 312 and wireless communication network core 308 during the handover.

Figure 4:
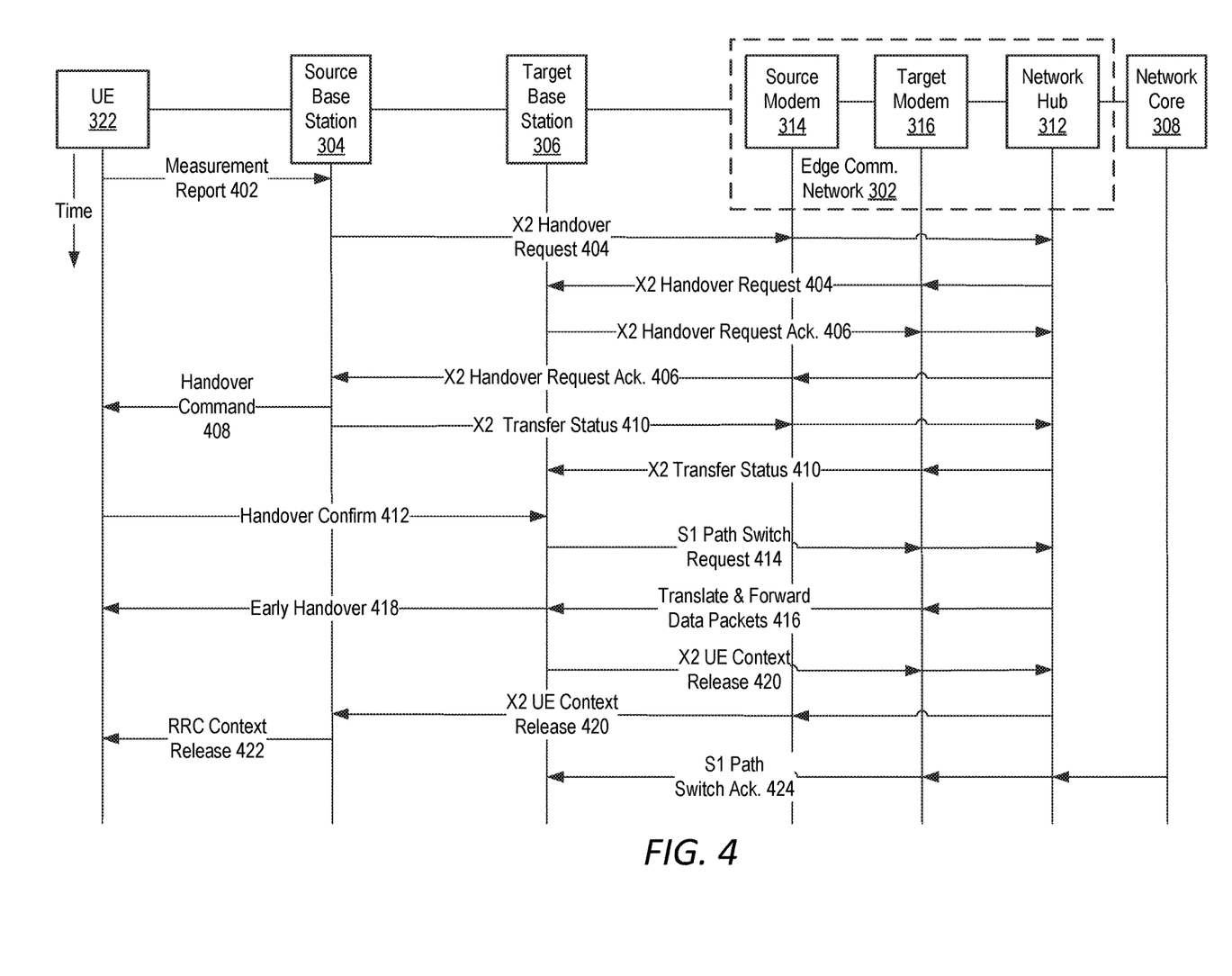
FIG. 4 is a flow diagram illustrating one example of a wireless base station handoff in the FIG. 3 communication system.

As an example, FIG. 4 is a flow diagram illustrating one example of a wireless base station X2 handoff in communication system 300. It should be appreciated, however, that communication system 300 is not limited to implementing X2 mobility; to the contrary, in some embodiments, network hub 312 is configured to detect other type of wireless signaling messages, such as S1 handoff-related messages, and process data packets in accordance with the detected wireless signaling message.

In the example scenario of FIG. 4, communication system 300 hands off UE 322 from wireless base station 304 to wireless base station 306 (FIG. 3). Specifically, UE 322 is initially connected to wireless base station 304, and UE 322 exchanges data with wireless base station 304 via wireless communication signals 330. Communication system 300 subsequently initiates a handover of UE 322 from wireless base station 304 to wireless base station 306, such as due to movement of UE 322 toward wireless base station 306, or due to overloading of wireless base station 304. UE 322 exchanges data with wireless base station 306 via wireless communication signals 332 after the handover. Accordingly, wireless base station 304 may be referred to as a source wireless base station, and wireless base station 306 may be referred to as a target wireless base station, during this example.

Referring again to FIG. 4, the example handover begins with UE 322 transmitting a measurement report 402 to source wireless base station 304. Measurement report 402 indicates, for example, received signal strength of each of source wireless base station 304 and target wireless base station 306 at UE 322. Source wireless base station 304 determines from measurement report 402 that UE 322 would be better-served by target wireless base station 306 than by source wireless base station 304, such as due to received signal strength of target wireless base station 306 being stronger than received signal strength of source wireless base station 304, at UE 322. Consequently, source wireless base station 304 transmits an X2 handover request 404 to target wireless base station 306 via source modem 314, network hub 312, and target modem 316. Target wireless base station 306 acknowledges X2 handover request 404 by sending an X2 handover request acknowledge 406 to source wireless base station 304, via target modem 316, network hub 312, and source modem 314.

Source wireless base station 304 next transmits a handover command 408 to UE 322, and source wireless base station 304 then notifies target wireless base station 306 that the handover is proceeding by transmitting an X2 transfer status 410 to target wireless base station 306 via source modem 314, network hub 312, and target modem 316. UE 322 transmits a handover confirm 412 to target wireless base station 306, and target wireless base station 306 proceeds to transmit a S1 path switch request 414 to network hub 312.

Network hub 312 determines occurrence of the handover from S1 path switch request 414, and in response to determining occurrence of the handover, network hub 312 translates and forwards, to target base station 306, data packets 416 intended for UE 322. Specifically, (a) network hub 312 translates an address of data packets intended for UE 322 from an address of source wireless base station 304 to an address of target wireless base station 306, and (b) network hub 312 subsequently forwards the data packets to target base station 306. Accordingly, network hub 312 routes data packets intended for UE 322 to target base station 306, in response to receiving 51 path switch request 414. It should be appreciated that routing of data packets intended for UE 322 to target base station 306 is accomplished without requiring transmission of wireless signaling messages between edge communication network 302 and wireless communication network core 308, thereby enabling an early handoff of UE 322 from source wireless base station 304 to target wireless base station 306 and promoting low latency in the handoff In some embodiments, network hub 312 is configured to prioritize processing of data packets intended for UE 322, e.g. prioritizing readdressing and forwarding of the data packets, over other activities of network hub 312, to further minimize handoff latency. Target wireless base station 306 optionally transmits an early handover message 418 to UE 322, to notify UE 322 of the handoff.

Target wireless base station 306 transmits an X2 UE context release 420 to source wireless base station 304 via target modem 316, network hub 312, and source modem 314. Source wireless base station 304 transmits a RRC context release 422 to UE 322, and wireless communication network core 308 transmits a S1 path switch acknowledge 424 to target base station 306 via network hub 312 and target modem 316. S1 path switch acknowledge 424 is a wireless signaling message indicating that wireless communication network core 308 is routing data packets intended for UE 322 to target wireless base station 306. Network hub 312 therefore discontinues translating an address of data packets intended for UE 322, in response to receiving S1 path switch acknowledge 424. The handover of UE 322 is then complete, i.e. UE 322 is connected to target wireless base station 306 instead of to source wireless base station 304, after wireless communication network core 308 modifies EPS bearers in accordance with the handover.

Figure 5:
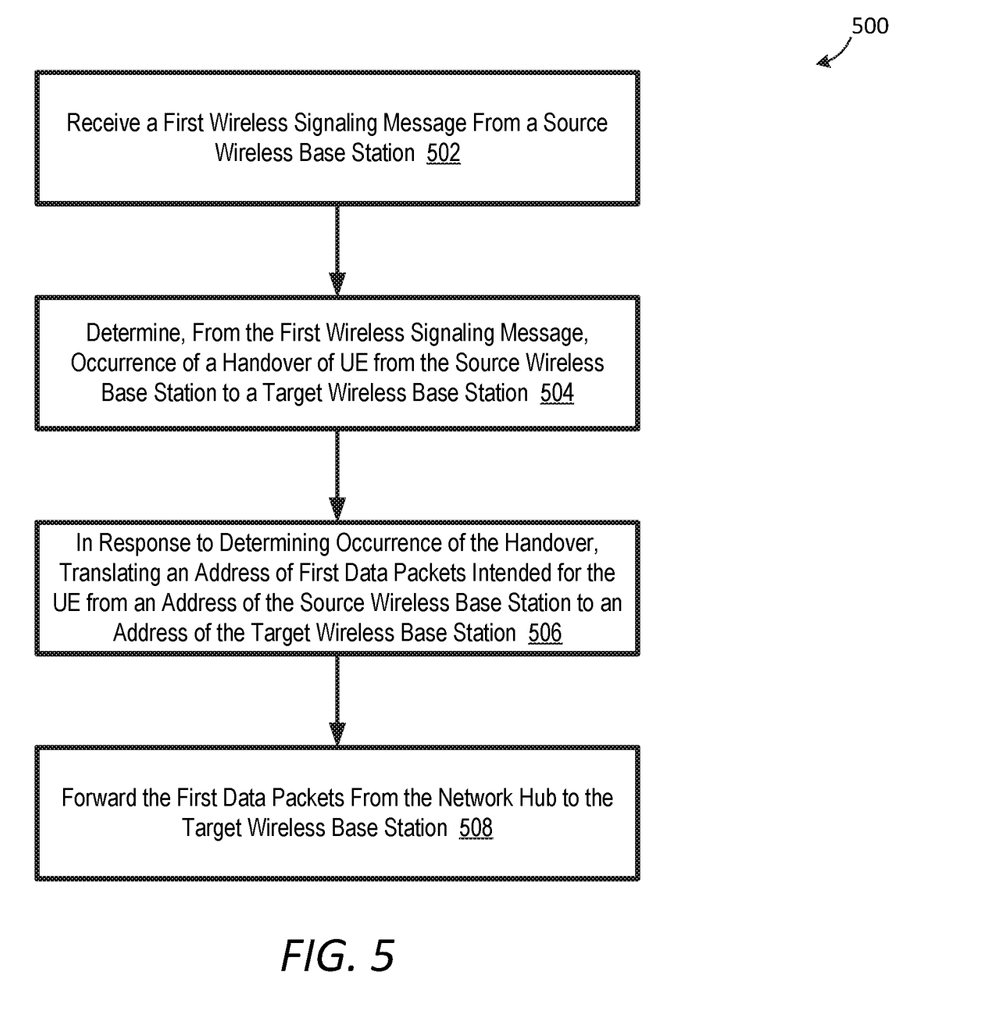
FIG. 5 is a flow chart illustrating a method for reducing latency during handover of UE between wireless base stations, according to an embodiment.

In some embodiments, processor 324 is configured to execute instructions 328 to perform a method 500 for reducing latency during handover of UE between wireless base stations, as illustrated in FIG. 5. In a block 502 of method 500, network hub 312 receives a first wireless signaling message from a wireless base station. The first wireless signaling message indicates occurrence of a UE handover between wireless base stations supported by edge communication network 302. In one example of block 502, network hub 312 receives S1 path switch request 414 from target wireless base station 306 via target modem 316 (see FIG. 4).

In a block 504 of method 500, network hub 312 determines, from the first wireless signaling message, occurrence of a handover of UE from a source wireless base station to a target wireless base station. In one example of block 504, network hub 312 determines, from S1 path switch request 414, occurrence of an X2 handover of UE 322 from source wireless base station 304 to target wireless base station 306. In a block 506 of method 500, network hub 312 translates an address of first data packets intended for the UE from an address of the source wireless base station to an address of the target wireless base station. In one example of block 506, network hub 312 translates an address of data packets intended for UE 322 from an address of source wireless base station 304 to an address of target wireless base station 306. Network hub 312 translates the address of a data packet, for example, by replacing a first value in an address field of the data packet with a second value in the address field of the data packet, where the first value represents source wireless base station 304 and the second value represent target wireless base station 306. In a block 508 of method 500, network hub 312 forwards the first data packets intended for the UE to the target wireless base station. In one example of block 508, network hub 312 forwards data packets intended for UE 322 to target wireless base station 306. In some embodiments of method 500, processor 324 is further configured to execute instructions 428 to prioritize some or all of the blocks of method 500 over other activity of network hub 312, to promote low-latency during UE handover among wireless base stations.

Discussed below with respect to FIGS. 6-9 are several specific embodiments of communication system 300 of FIG. 3. It should be appreciated, however, that communication system 300 is not limited to the embodiments of FIGS. 6-9. To the contrary, communication system 300 may be embodied in many other manners, as long as communication system 300 is configured to (a) detect at least one type of wireless signaling message from a wireless base station, e.g. an S1 path switch request from a wireless base station, and (b) process the data packets in accordance with the wireless signaling message, thereby eliminating the need to transmit the wireless signaling message to wireless communication network core 308.

Figure 6:
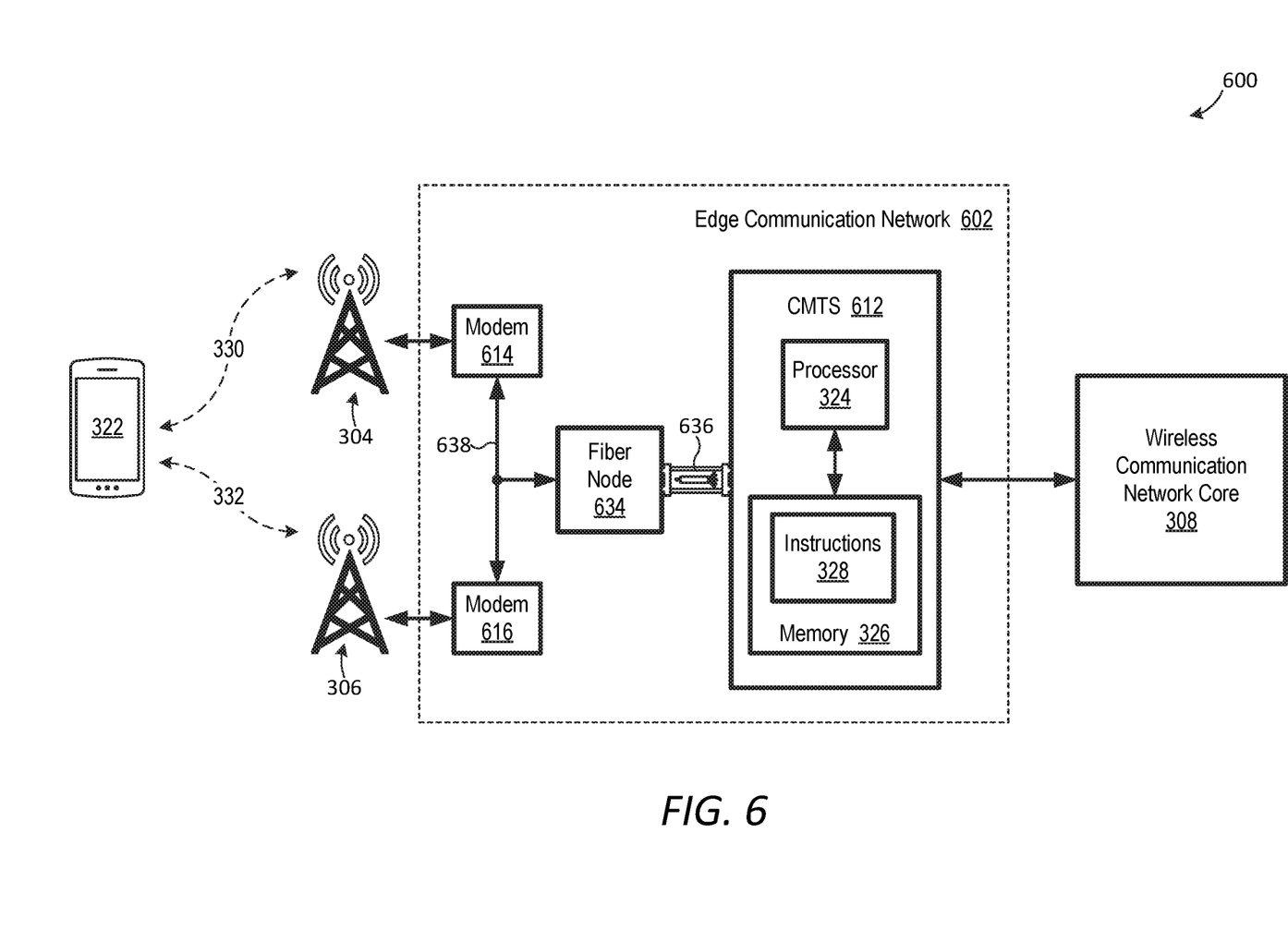
FIG. 6 is a schematic diagram of an embodiment of the FIG. 3 communication system where a network hub is configured as a cable modem termination system (CMTS).

FIG. 6 is a schematic diagram of a communication system 600, which is an embodiment of communication system 300 where edge communication network 302 is embodied by an edge communication network 602. Network hub 312 is embodied by a CMTS 612, and modems 314 and 316 are embodied by cable modems (CMs) 614 and 616, respectively. CMTS 612 is communicatively coupled to a fiber node 634 via one or more fiber optical cables 636, and fiber node 634 is communicatively coupled to CMs 314 and 316 via coaxial electrical cable 638. Accordingly, edge communication network 602 has a hybrid fiber optical cable and coaxial electrical cable architecture, sometimes referred to as a "HFC" architecture. In some embodiments, coaxial electrical cable 638 is shared by CMs 614 and 616. Fiber node 634 converts signals in the optical domain on fiber optic cables 636 to signals in the electrical domain on coaxial electrical cable 638, and vice versa.

Figure 7:
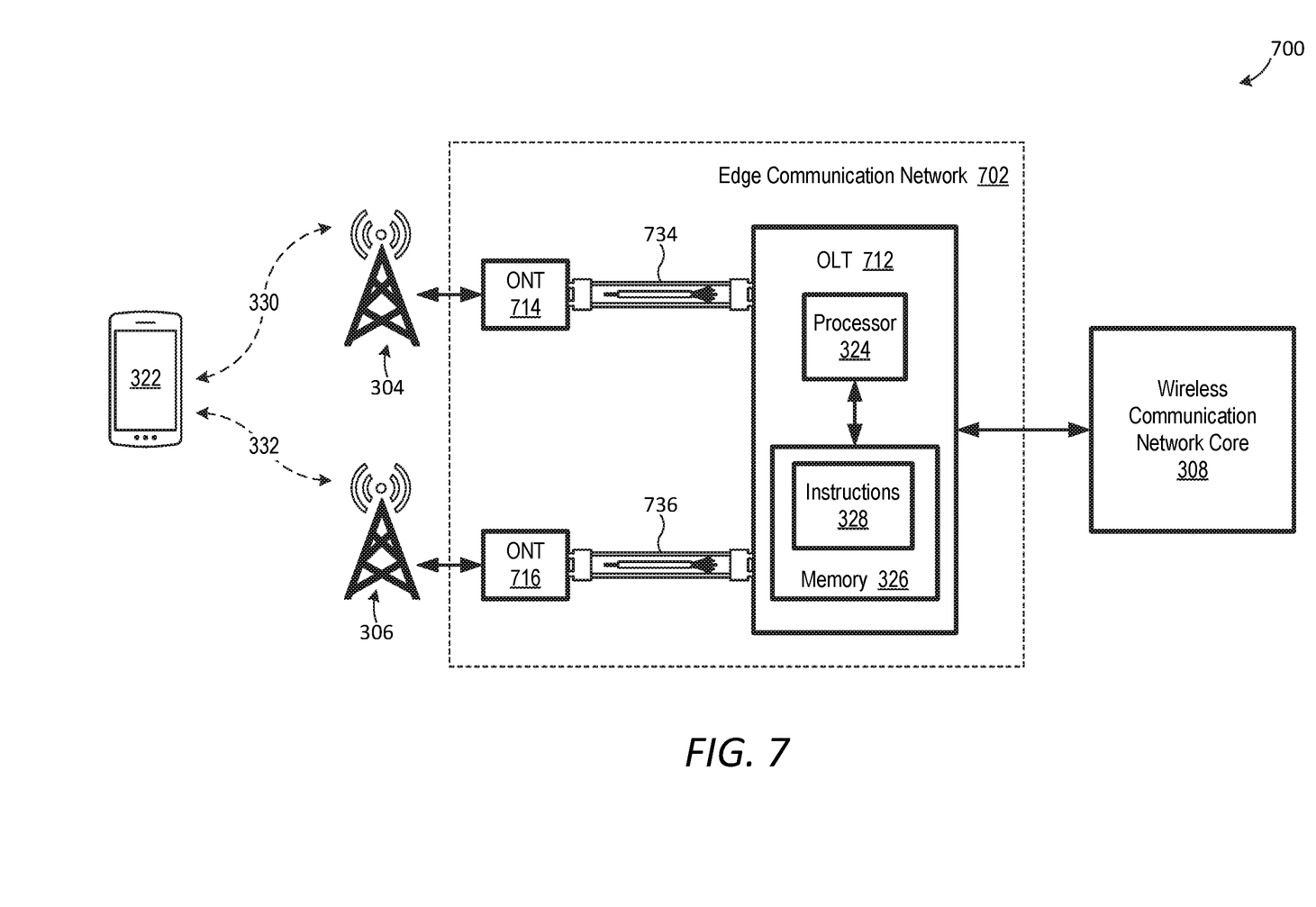
FIG. 7 is a schematic diagram of an embodiment of the FIG. 3 communication system where a network hub is configured as an optical line terminal (OLT).

FIG. 7 is a schematic diagram of a communication system 700, which is an embodiment of communication system 300 where edge communication network 302 is embodied by an edge communication network 702. Network hub 312 is embodied by an OLT 712, and modems 314 and 316 are embodied by optical networking units (ONTs) 714 and 716, respectively. OLT 712 is communicatively coupled to ONTs 714 and 716 via fiber optical cables 734 and 736, respectively. In some embodiments, fiber optical cables 734 and 736 are joined via a splitter to a common fiber optical cable (not shown) connected between OLT 712 and each of fiber optical cables 734 and 736.

Figure 8:
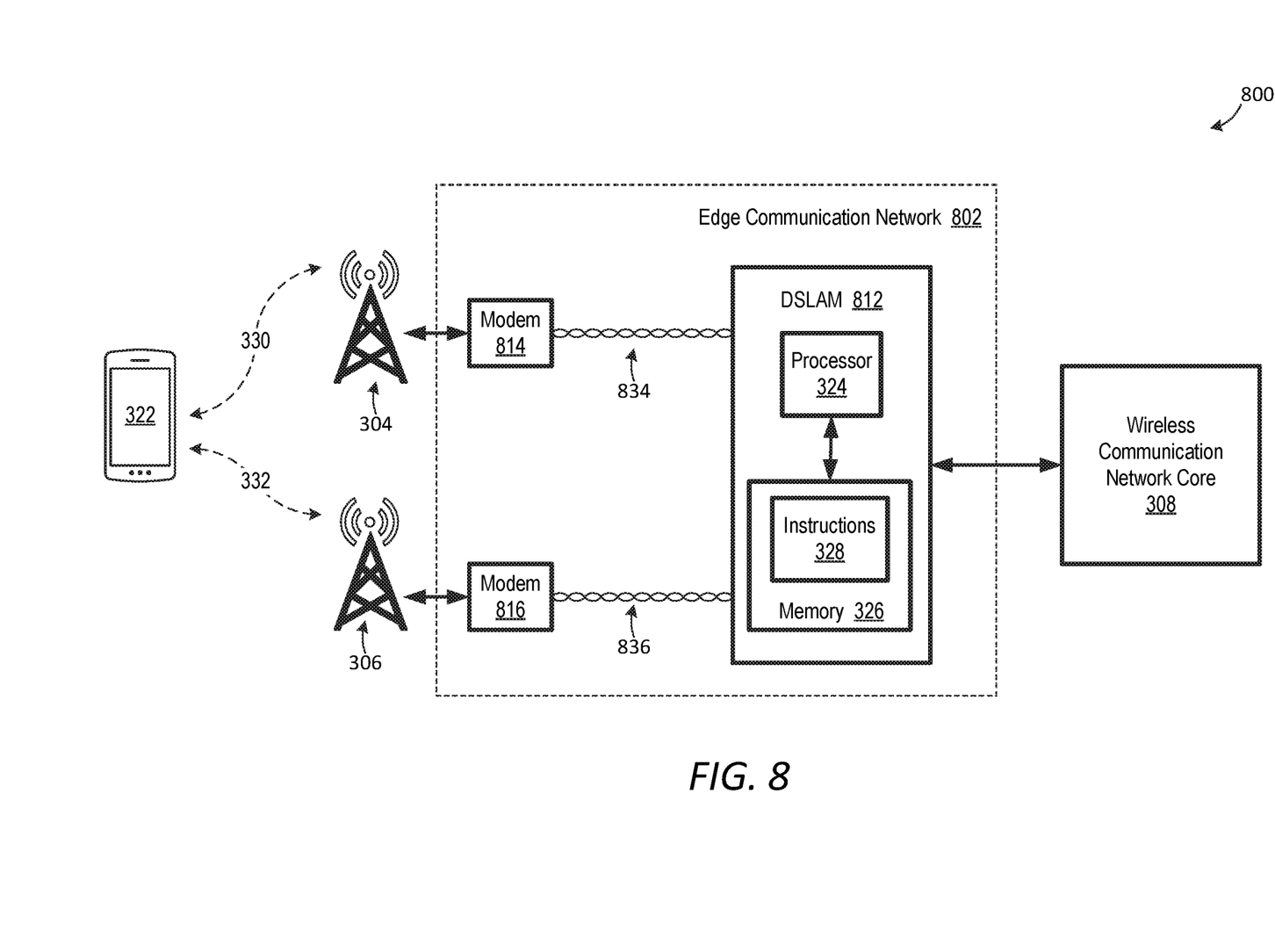
FIG. 8 is a schematic diagram of an embodiment of the FIG. 3 communication system where a network hub is configured as a digital subscriber line access multiplexer (DSLAM).

FIG. 8 is a schematic diagram of a communication system 800, which is an embodiment of communication system 300 where edge communication network 302 is embodied by an edge communication network 802. Network hub 312 is embodied by a DSLAM 812, and modems 314 and 316 are embodied by digital subscriber line (DSL) modems 814 and 816, respectively. DSLAM 812 is communicatively coupled to DSL modems 814 and 816 via twisted-pair electrical cables 834 and 836, respectively.

Figure 9:
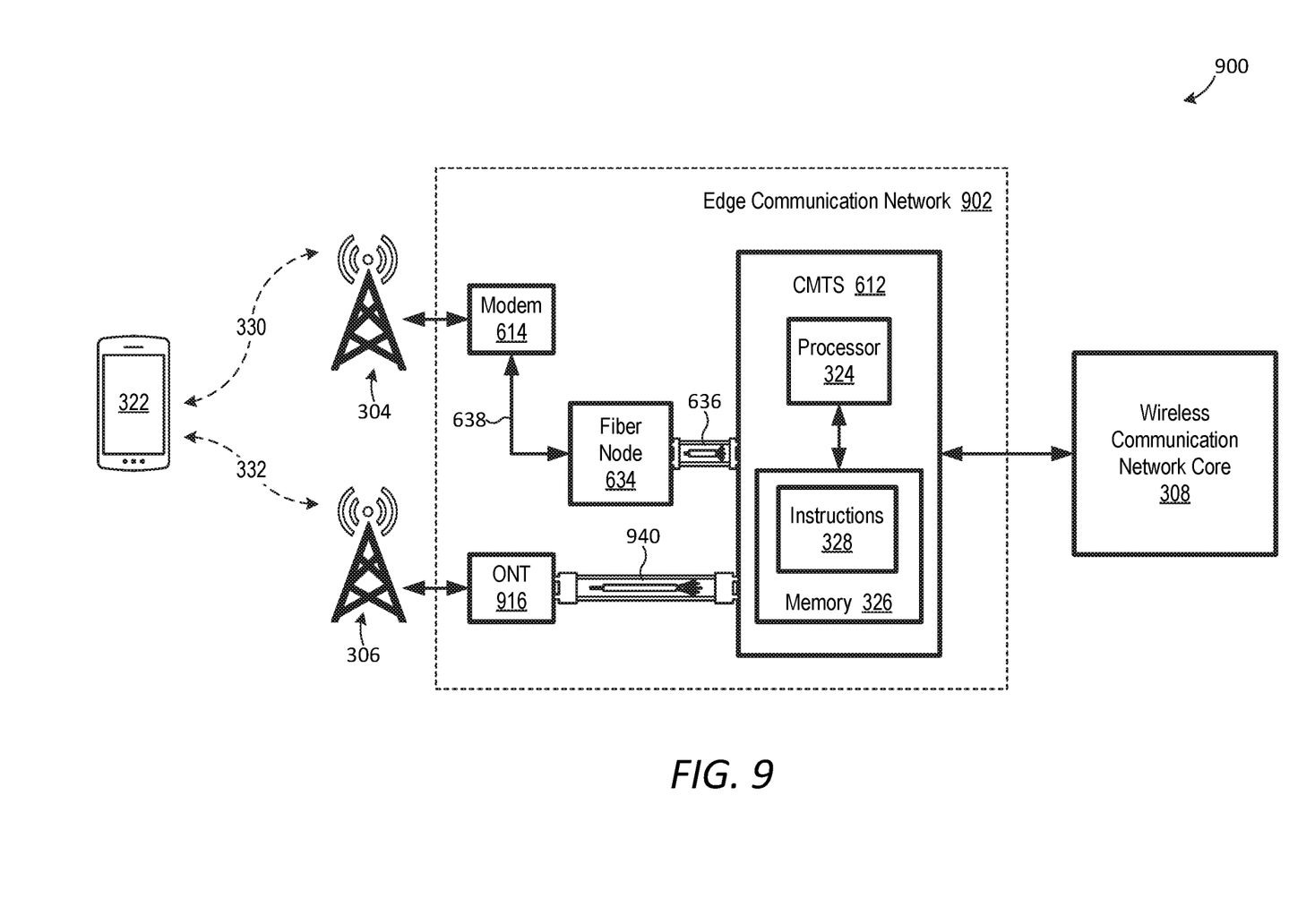
FIG. 9 is a schematic diagram of another embodiment of the FIG. 3 communication system where a network hub is configured as a CMTS.

Modems of communication system 300 need not all be of the same type. For example, FIG. 9 is a schematic diagram of a communication system 900, which is an embodiment of communication system 300 where edge communication network 302 is embodied by an edge communication network 902 including both a CM and an ONT. Edge communication network 902 is similar to edge communication network 602, but with CM 616 replaced with an ONT 916. A fiber optical cable 940 communicatively couples ONT 916 to CMTS 612.

Combinations of Features

Features described above may be combined in various ways without departing from the scope hereof. The following examples illustrate some possible combinations:

(A1) A method for reducing latency during handover of UE between wireless base stations may include (1) receiving, at a network hub in an edge communication network, a first wireless signaling message from a source wireless base station, (2) determining, from the first wireless signaling message at the network hub, occurrence of a handover of UE from the source wireless base station to a target wireless base station, (3) in response to determining occurrence of the handover, translating, at the network hub, an address of first data packets intended for the UE from an address of the source wireless base station to an address of the target wireless base station, and (4) forwarding the first data packets from the network hub to the target wireless base station.

(A2) The method denoted as (A1) may further include, in response to determining occurrence of the handover, increasing priority of processing of the first data packets at the network hub.

(A3) Any of the methods denoted as (A1) and (A2) may further include (1) receiving, at the network hub, a second wireless signaling message from a wireless communication network core, and (2) in response to receiving the second wireless signaling message at the network hub, discontinuing translation of the address of the first data packets intended for the UE.

(A4) In the method denoted as (A3), the second wireless signaling message may include a path switch acknowledgement message.

(A5) In any of the methods denoted as (A1) through (A4), the first wireless signaling message may include one of a LTE wireless signaling message, a 5G NR wireless signaling message, and a 6G wireless signaling message.

(A6) In the method denoted as (A5), the first wireless signaling message may include a path switch request message.

(A7) In any of the methods denoted as (A1) through (A6), each of the source wireless base station and the target wireless base station may include an eNB.

(A8) In any of the methods denoted as (A1) through (A6), each of the source wireless base station and the target wireless base station may include a gNB.

(A9) In any of the methods denoted as (A1) through (A8), the network hub may include a CMTS.

(A10) In any of the methods denoted as (A1) through (A8), the network hub may include an OLT.

(A11) In any of the methods denoted as (A1) through (A8), the network hub may include a DSLAM.

(B1) A network hub may include a processor and a memory including instructions. The processor may be configured to execute the instructions to (1) receive a first wireless signaling message from a source wireless base station, (2) determine, from the first wireless signaling message, occurrence of a handover of UE from the source wireless base station to a target wireless base station, (3) in response to determining occurrence of the handover, translate an address of first data packets intended for the UE from an address of the source wireless base station to an address of the target wireless base station, and (4) forward the first data packets from the network hub to the target wireless base station.

(B2) In the network hub denoted as (B1), the processor may be further configured to execute the instructions to increase priority of processing of the first data packets by the network hub.

(B3) In any of the network hubs denoted as (B1) and (B2), the processor may be further configured to execute the instructions to (1) receive a second wireless signaling message from a wireless communication network core, and (2) in response to receiving the second wireless signaling message, discontinuing translation of the address of the first data packets intended for the UE.

(B4) In the network hub denoted as (B3), the second wireless signaling message may include a path switch acknowledgement message.

(B5) In any one of the network hubs denoted as (B1) through (B4), the first wireless signaling message may include one of a LTE wireless signaling message, a 5G NR wireless signaling message, and a 6G wireless signaling message.

(B6) In the network hub denoted as (B5), the first wireless signaling message may include a path switch request message.

(B7) In any one of the network hubs denoted as (B1) through (B6), the network hub may be configured as a CMTS.

(B8) In any one of the network hubs denoted as (B1) through (B6), the network hub may be configured as an OLT.

(B9) In any one of the network hubs denoted as (B1) through (B6), the network hub may be configured as a DSLAM.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for reducing latency during handover of user equipment (UE) between wireless base stations, comprising:
   receiving, at a network hub in an edge communication network, a first wireless signaling message from a source wireless base station;
   determining, from the first wireless signaling message at the network hub, occurrence of a handover of UE from the source wireless base station to a target wireless base station;
   in response to determining occurrence of the handover, translating, at the network hub, an address of first data packets intended for the UE from an address of the source wireless base station to an address of the target wireless base station; and
   forwarding the first data packets from the network hub to the target wireless base station.

2. The method of claim 1, further comprising, in response to determining occurrence of the handover, increasing priority of processing of the first data packets at the network hub.

3. The method of claim 1, further comprising:
   receiving, at the network hub, a second wireless signaling message from a wireless communication network core; and
   in response to receiving the second wireless signaling message at the network hub, discontinuing translation of the address of the first data packets intended for the UE.

4. The method of claim 3, wherein the second wireless signaling message comprises a path switch acknowledgement message.

5. The method of claim 1, wherein the first wireless signaling message comprises one of a long-term evolution (LTE) wireless signaling message, a fifth-generation (5G) new radio (NR) wireless signaling message, and a sixth-generation (6G) wireless signaling message.

6. The method of claim 5, wherein the first wireless signaling message comprises a path switch request message.

7. The method of claim 5, wherein each of the source wireless base station and the target wireless base station comprises an evolved NodeB (eNB).

8. The method of claim 5, wherein each of the source wireless base station and the target wireless base station comprises a next generation NodeB (gNB).

9. The method of claim 1, wherein the network hub comprises a cable modem termination system (CMTS).

10. The method of claim 1, wherein the network hub comprises an optical line terminal (OLT).

11. The method of claim 1, wherein the network hub comprises a digital subscriber line access multiplexer (DSLAM).

12. A network hub, comprising:
    a memory including instructions; and
    a processor configured to execute the instructions to:
        receive a first wireless signaling message from a source wireless base station,
        determine, from the first wireless signaling message, occurrence of a handover of user equipment (UE) from the source wireless base station to a target wireless base station,
        in response to determining occurrence of the handover, translate an address of first data packets intended for the UE from an address of the source wireless base station to an address of the target wireless base station, and
        forward the first data packets from the network hub to the target wireless base station.

13. The network hub of claim 12, wherein the processor is further configured to execute the instructions to increase priority of processing of the first data packets by the network hub.

14. The network hub of claim 12, wherein the processor is further configured to execute the instructions to:
    receive a second wireless signaling message from a wireless communication network core; and
    in response to receiving the second wireless signaling message, discontinuing translation of the address of the first data packets intended for the UE.

15. The network hub of claim 14, wherein the second wireless signaling message comprises a path switch acknowledgement message.

16. The network hub of claim 12, wherein the first wireless signaling message comprises one of a long-term evolution (LTE) wireless signaling message, a fifth-generation (5G) new radio (NR) wireless signaling message, and a sixth-generation (6G) wireless signaling message.

17. The network hub of claim 16, wherein the first wireless signaling message comprises a path switch request message.

18. The network hub of claim 12, wherein the network hub is configured as a cable modem termination system (CMTS).

19. The network hub of claim 12, wherein the network hub is configured as an optical line terminal (OLT).

20. The network hub of claim 12, wherein the network hub is configured as a digital subscriber line access multiplexer (DSLAM).

* * * * *